Aug. 7, 1928.
J. E. OTIS, JR
1,679,540
PNEUMATIC TOOL
Filed June 21, 1926
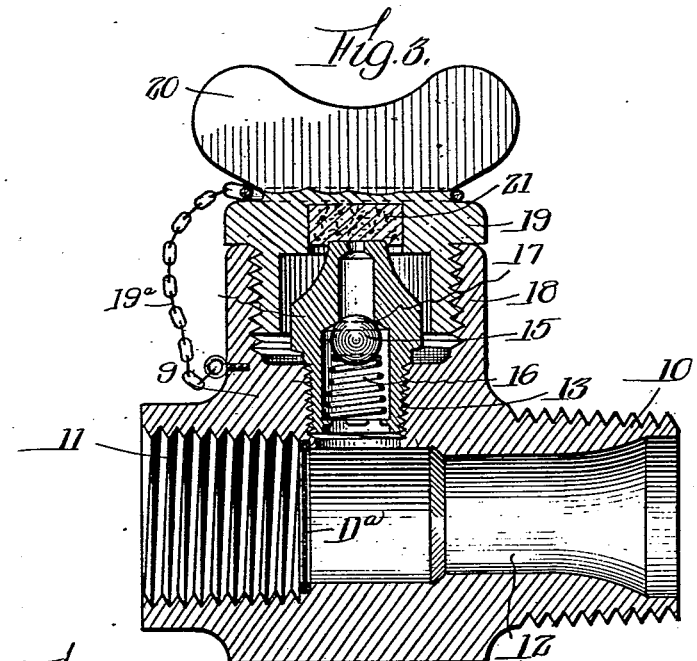
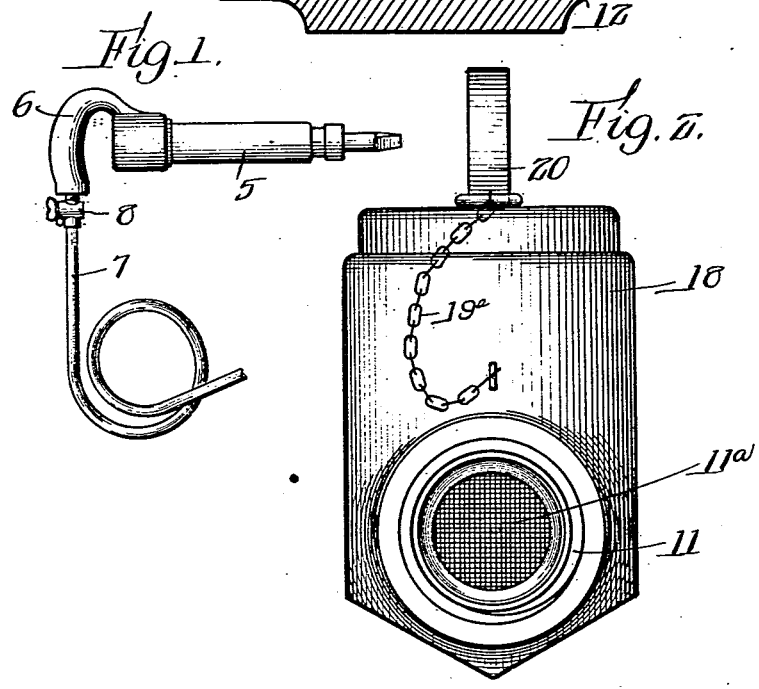
Inventor:
Joseph E. Otis, Jr.
By Pierce and Sweet attys.

Patented Aug. 7, 1928.

1,679,540

UNITED STATES PATENT OFFICE.

JOSEPH E. OTIS, JR., OF WINNETKA, ILLINOIS, ASSIGNOR TO THE BASSICK MANUFACTURING COMPANY, OF CHICAGO, ILLINOIS, A CORPORATION OF DELAWARE.

PNEUMATIC TOOL.

Application filed June 21, 1926. Serial No. 117,579.

My invention relates to improvements in pneumatic tools and is particularly concerned with the provision of novel means for supplying lubricant to such tools.

Heretofore, various means have been proposed for supplying lubricant to such tools but all of these devices have been deficient in one respect or another, so that at the present time the usual method of lubricating such tools is to detach the air conduit from the intake end thereof, pour in a quantity of lubricant and then connect the conduit with the tool. This means is slow and unsatisfactory and the tools are often used under such conditions that considerable amounts of dirt and grit are introduced along with the lubricant.

The object of my present invention is to provide means whereby any desired amount of lubricant can be supplied to a pneumatic tool without the necessity of disconnecting the hose and without the necessity of reducing the air pressure in the hose.

I accomplish the above and other objects by providing means whereby lubricant, under pressures greater than those used in the pneumatic tools, may be injected directly into the air stream at any convenient point.

Another object of my invention is to provide means, of the character described, that will not permit the escape of air, either during the lubricating operation or thereafter.

Another object of my invention is to provide lubricating means, such as described, that is simple in construction, economical to manufacture and easy to operate.

Other objects of my invention will appear as this description progresses, reference being had to the accompanying drawings, in which:

Figure 1 is a side elevation of a pneumatic tool, showing my improved lubricating device inserted between the air hose, or conduit, and the tool;

Figure 2 is an end elevation of the lubricating device; and

Figure 3 is a central, longitudinal section therethrough.

In Figure 1 I have illustrated a pneumatic tool 5, of conventional design, having the usual handle 6 that forms the air intake for the tool. A suitable source of compressed air, not shown, supplies air under pressure to the tool through the hose, or conduit, 7.

At 8 I have indicated, as a whole, the device forming a part of my invention, the details of this device being shown in Figures 2 and 3. As shown therein, it comprises a body member 9, one end of which is externally threaded, as shown at 10, to screw into the intake end of the pneumatic tool 5. The opposite end is internally threaded, as shown at 11, to receive the connecting device at the end of the conduit 7, and is preferably provided with an air screen 11$^a$. A bore 12 extends through the body member for establishing communication between the conduit and the tool.

The body member has a lateral opening 13 that communicates with the bore 12 and which is internally threaded to receive the threaded inner end of the high pressure lubricant receiving device 14. This device comprises a check valve 15 that is held in its closed position by the spring 16 upon the seat 17. High pressure lubricant receiving devices of this kind are well known to those skilled in this art and are shown and described in the patent to Oscar U. Zerk, No. 1,475,980.

An annular boss 18 extends outwardly from the body member and surrounds the outer end of the lubricant receiving device 14. This boss is internally threaded for receiving the externally threaded cap 19 which is provided with wings 20 whereby it can be attached to or removed from the boss. This cap carries a gasket 21 of cork, leather, or other suitable material, for effecting a tight seal of the outer end of the fitting. I prefer to provide a suitable flexible attachment means 19$^a$ to keep the cap 19 from being misplaced when removed.

In operation, after the lubricant device 8 has been attached, as shown in Figure 1, whenever it is desired to supply the tool with lubricant, the cap 19 is removed and a lubricant compressor, similar to that shown in the Zerk patent above referred to, is used for injecting lubricant through the lubricant receiving device into the air stream passing to the tool.

Lubricant compressors such as referred to above are capable of supplying lubricant under much higher pressures than the air pressures ordinarily used in pneumatic tools, and it is, therefore, a comparatively easy matter to feed any desired quantity of lubricant to the pneumatic tool. Upon the removal of the lubricant compressor from the receiving device 14, the check valve 15 immediately closes, under the tension of the spring 16 and the pressure of the air flowing through the body member, and thereby prevents the escape of both air and lubricant through the receiving device.

For preventing any possible leakage of air or lubricant through the lubricant receiving device, I have provided the gasket 21 and cap described above. The cap and the flange 18 also provide means for preventing injury to the lubricant receiving device. This is of particular importance, due to the fact that most pneumatic tools are subjected to very severe usage and if the lubricant receiving device were not suitably protected, it would probably soon become damaged.

While I have referred to the particular type of lubricant receiving device and compressor shown in the patent to Zerk, described above, it is to be understood that my invention contemplates the use of any other suitable receiving device and compressor.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. The combination with a pneumatic tool and a conduit for supplying air thereto, of means for introducing lubricant under high pressure into said tool, comprising a body member inserted between said conduit and said tool and having a bore therethrough for conducting air from said conduit to said tool, said body member having an annular flange at one side thereof forming a recess and an opening between said recess and said bore, a high pressure lubricant receiving device having its inner end secured in said opening and its outer end housed in said recess, said device comprising an inwardly opening check valve, and a cap for said recess, said cap carrying a gasket for sealing the lubricant receiving opening in said device.

2. The combination with a pneumatic tool and a conduit for supplying air thereto, of means for introducing lubricant under high pressure into said tool, comprising a body member inserted between said conduit and said tool and having a bore therethrough for conducting air from said conduit to said tool, said body member having an annular flange at one side thereof forming a recess and an opening between said recess and said bore, a high pressure lubricant receiving device having its inner end secured in said opening and its outer end housed in said recess, said device comprising an inwardly opening check valve, and a removable cap threaded in said recess and having sealing means engaging the end portion of said device.

3. The combination with a pneumatic tool and a conduit for supplying air thereto, of means for feeding lubricant under high pressure into the intake end of said tool, comprising a body member inserted between said conduit and said tool and having a bore therethrough for establishing communication between said conduit and said tool, said body member having a lateral opening, a high pressure lubricant receiving device having its inner end inserted in said opening, said body member comprising means for housing the outer end of said receiving device, and means for preventing the escape of air through said receiving device.

4. The combination with a pneumatic tool and a conduit for supplying air thereto, of a body member inserted between said conduit and said tool and having a bore for establishing communication between said conduit and said tool, said body member having an opening communicating with said bore, a high pressure lubricant receiving device communicating with said bore, and a detachable cap on said body for sealing the inlet opening of said device.

5. Means for supplying lubricant under high pressure to the intake end of a pneumatic tool comprising a body member having a bore extending therethrough and a lateral opening communicating with said bore, a lubricant receiving device connected with said opening and comprising means for preventing the escape of air through said lubricant receiving device, whereby lubricant may be forced directly into said member while said member contains air under greater than atmospheric pressure.

6. Means for supplying lubricant to the intake end of a pneumatic tool comprising a body member having a bore extending therethrough and a lateral opening communicating with said bore, and a high pressure lubricant receiving device connected with said opening and comprising means for preventing the escape of air through said lubricant receiving device, whereby lubricant may be forced directly into said member while said member contains air under greater than atmospheric pressure.

7. The combination with a pneumatic tool, of means for supplying lubricant under high pressure to the intake end of said tool, said means comprising means for preventing the escape of air through said lubricant receiving means, whereby lubricant may be forced directly into said member while said member contains air under greater than atmospheric pressure.

8. Means for supplying lubricant under high pressure to the intake end of a pneumatic tool against air pressure therein comprising a body member having a bore therethrough and an opening constantly in communication with said bore, a lubricant receiving device connected with said opening, and an outwardly extending flange surrounding the outer end of said lubricant receiving device, said lubricant receiving device comprising a check valve for preventing the escape of air through said lubricant receiving device.

9. Means for supplying lubricant to a pneumatic tool comprising a section of conduit for supplying the operating fluid and having a lateral opening, a normally closed valve in said opening, and means at said opening for making a fluid-tight connection with a source of lubricant under pressure, said valve being adapted automatically to permit the passage of lubricant to said conduit section upon application of lubricant under a pressure greater than that of the fluid within the conduit and to prevent escape of fluid from said conduit when the pressure therein is greater than that of the lubricant at said source.

10. Means for supplying lubricant to a pneumatic tool comprising a section of conduit for supplying the operating fluid and having a lateral opening, a normally closed valve in said opening, means at said opening for making a fluid-tight connection with a source of lubricant under pressure, said valve being adapted automatically to permit the passage of lubricant to said conduit section upon application of lubricant under a pressure greater than that of the fluid within the conduit and to prevent escape of fluid from said conduit when the pressure therein is greater than that of the lubricant at said source, and a cap threaded over said opening and adapted to seal the inlet of said means.

In witness whereof I hereunto subscribe my name this 18th day of June, 1926.

JOSEPH E. OTIS, Jr.